UNITED STATES PATENT OFFICE.

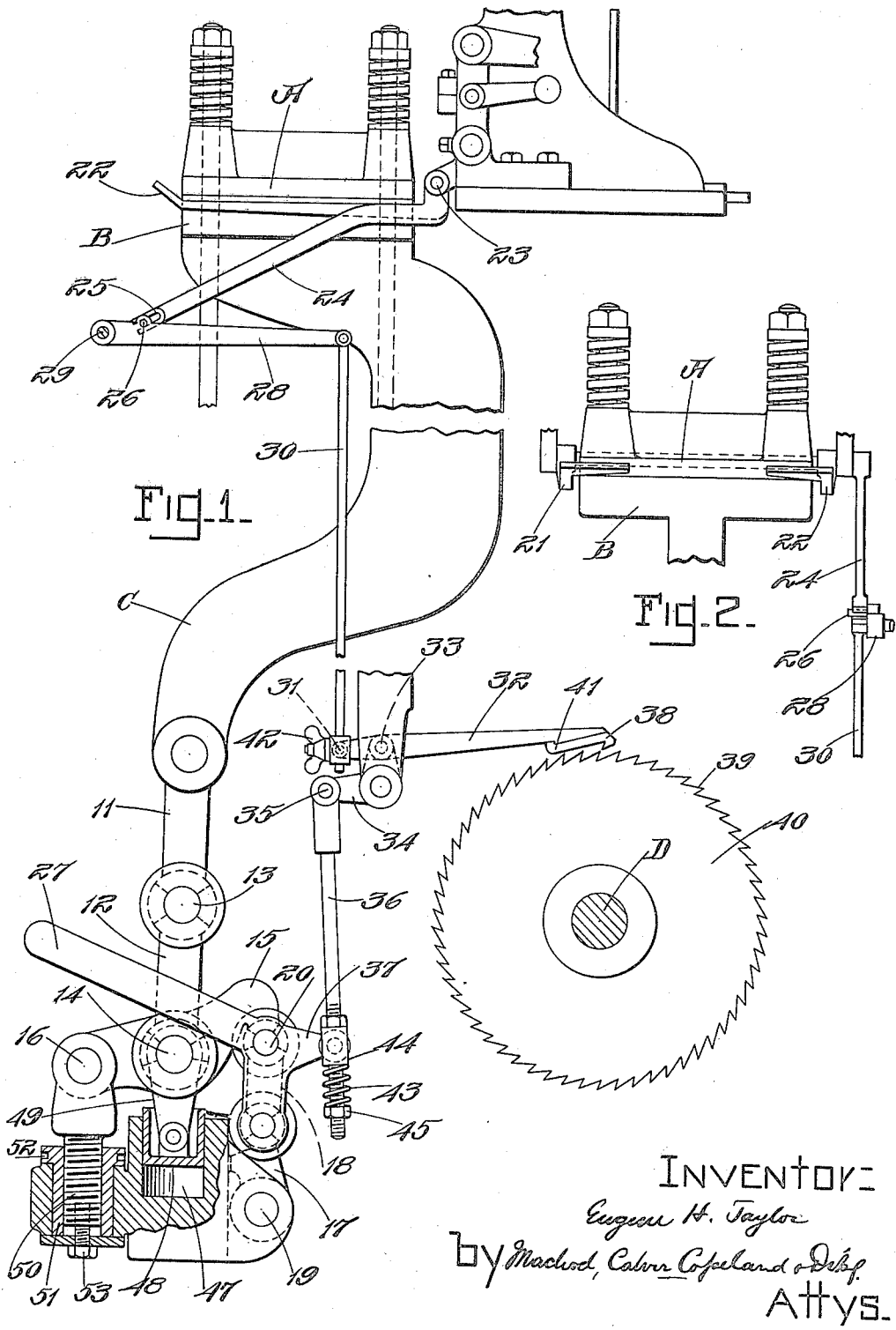

EUGENE H. TAYLOR, OF BOSTON, MASSACHUSETTS.

SAFETY DEVICE FOR BOX-ENDING MACHINES.

1,222,695.

Specification of Letters Patent.

Patented Apr. 17, 1917.

Application filed July 9, 1915. Serial No. 39,016.

*To all whom it may concern:*

Be it known that I, EUGENE H. TAYLOR, a citizen of the United States, residing at Boston, county of Suffolk, State of Massachusetts, have invented a certain new and useful Improvement in Safety Devices for Box-Ending Machines, of which the following is a specification, reference being had therein to the accompanying drawings.

In the manufacture of boxes there are commonly employed machines by means of which the end of a box is secured to a body consisting of two sides and the bottom. These machines comprise essentially a relatively fixed platen and a movable box form, the said two members being essentially a press and coöperating to subject the parts of the box to heavy pressure. In the operation of these machines the operator holds the box body with his or her fingers thereon at a point closely adjacent the pressing surfaces. Accidents resulting in the loss of fingers or of a hand have sometimes occurred.

My invention has for its object a safety mechanism for box ending and similar machines and presses which shall operate automatically to prevent the pressing members, *i. e.* in a box ending machine, the platen and box form coming together in case the operator's finger is between them or is in a position where injury is likely to occur. These machines run at relatively high rates of speed and it is necessary that the safety device shall be capable of operating substantially instantaneously and furthermore shall positively prevent the box form and platen coming together. It is also essential that arrangements be made so that the sudden interference with the normal operation in machines shall not do damage to any part of it.

The device embodying my invention operates almost instantaneously, is very delicate and reverses the movement of one of the pressing members if the fingers of the operator contact with it even to a slight extent. It is positive in its operation and absolutely prevents the box from contacting with the platen.

While I have shown my improved safety device as designed and constructed especially for use on a box ending machine, it will be understood that it is capable of being employed on a great variety of presses, stamps and other machines of a similar character, only such modifications being required as may be readily made by those skilled in the art.

The invention will be fully understood from the following description when taken in connection with the accompanying drawings and the novel features thereof will be pointed out and clearly defined in the claims at the close of the specification.

Referring to the drawings,—Figure 1 is a side elevation of a safety device, embodying my invention, together with the essential parts of a box ending machine to which the device is applied.

Fig. 2 is a front elevation of the upper portion of the device shown in Fig. 1.

Figure 3:
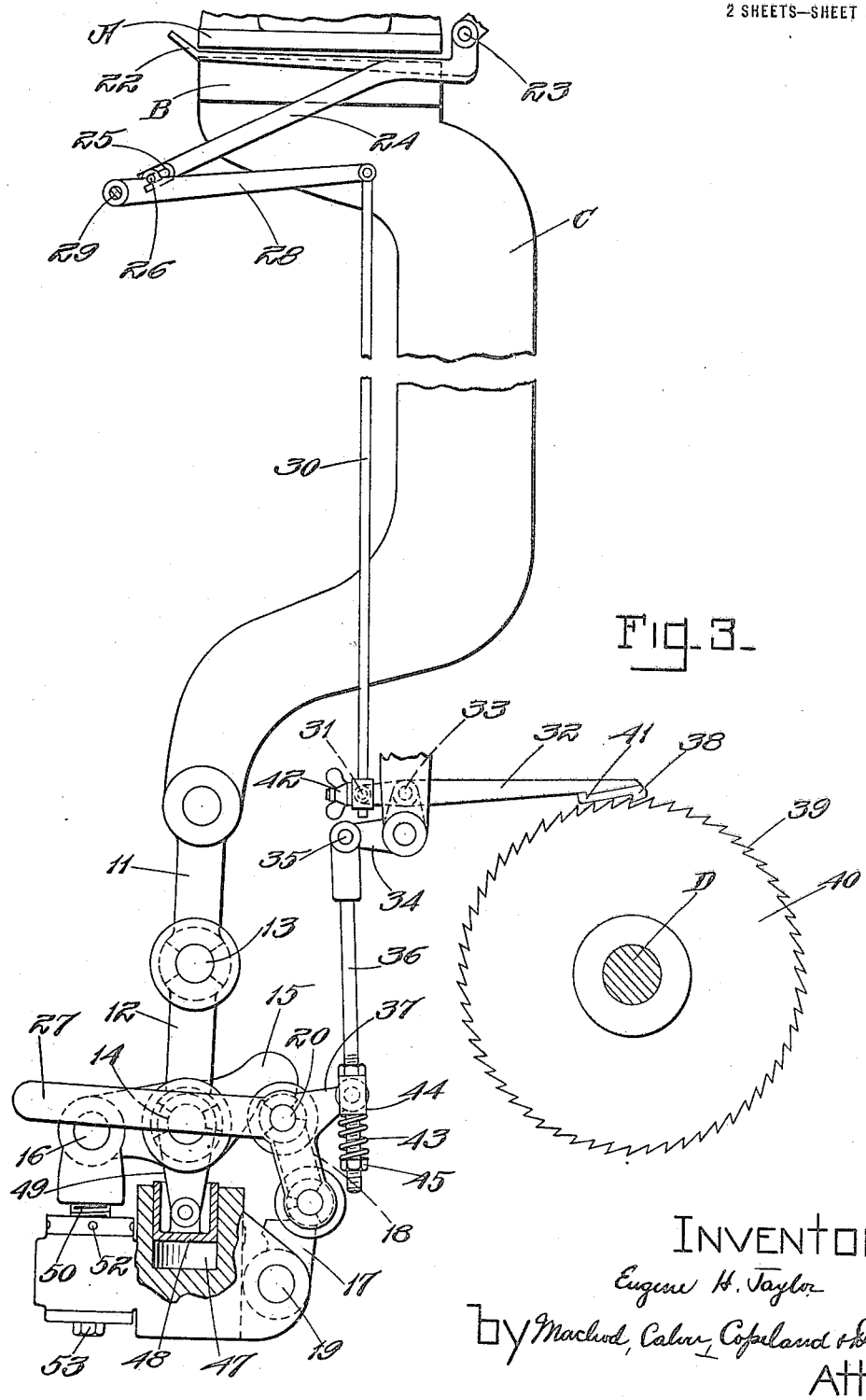
Fig. 3 is a view similar to Fig. 1 showing the positions occupied by the parts of the machine during the action of the safety device.

Referring now to the drawings, and particularly to Fig. 1 there is shown at A one press member (in this case the platen) which is relatively fixed, at B the other press member (the box form), at C a movable member commonly known as the horn, and at D the main shaft by which the machine is operated.

The horn C is reciprocated vertically by an actuating member shown in the drawings as a toggle joint and conveniently referred to as the main toggle joint, composed of two members 11 and 12 pivoted together at 13 and operated by connections with the main shaft. Said connections form no part of my invention and therefore are not shown. At 14 is indicated the fixed pivot of the main toggle joint. This fixed pivot 14 is normally stationary but the means provided for preventing the box form coming in contact with the platen operates upon the fixed pivot 14 to lower it suddenly whenever anything is interposed between the press members near the edges thereof.

At 15 is shown a lever pivoted at 16 to an adjustable stud 50. This stud is screw threaded as shown and engages a sleeve 51 freely rotatable in a suitable hole in the frame of the machine. To raise or lower the pivot 16, the sleeve is rotated by a spanner engaging the holes 52, and is then locked in position by tightening the set screw 53. By this means the pivot 16 may be adjusted vertically as desired. The fixed pivot 14 is about mid-way of the length of the supporting lever 15. At the end opposite to the pivot 16, the supporting lever 15 is connected to the upper end of one member of a secondary toggle joint comprising two members 17 and 18. The member 17 is pivoted at 19 to the frame of the machine and the member 18 is pivoted to the lever 15 at the point 20. Under normal conditions the secondary toggle joint is straight and remains stationary thereby supporting the pivot 14 in fixed position to enable the box form to exert a heavy pressure on the box end and body which lie between them.

The parts heretofore described are made very strong to enable them to resist the reaction produced by the pressure of the box form against the platen.

The operation of reversing the direction of movement of the pressing member, thereby interrupting the actuation of the pressing members, in case anything is interposed between the box form and the platen results from the bending or breaking of the secondary toggle thereby lowering the supporting lever 15 and lowering the fixed pivot 14 as the machine continues its movement. This brings the box form to rest and then lowers it slightly as the secondary toggle collapses, the further movement resulting from the continued straightening of the main toggle not being enough to overcome the lowering produced by the collapse of the secondary toggle.

The breaking of the secondary toggle is accomplished by the following mechanism. At 21 and 22 (see Fig. 2), is shown a pair of feelers pivoted on a rod 23, the said feelers 21 and 22 projecting downwardly and then forwardly parallel with and closely adjacent the side edges of the platen. At 24 is shown an arm which extends downwardly and is likewise fixed to the rod 23 forming with the two feelers 21 and 22 and the shaft 23 a rock shaft. The lower end of the arm 24 is forked as shown at 25 to engage a pin 26 carried on a lever 28 pivoted at 29 to the frame of the machine. The pin 26 is placed relatively close to the pivot 29 so that a small movement of the feelers 21 and 22 will produce a somewhat greater movement of the parts which are moved by it. From the right hand end of the arm 28, depends a rod 30 connected at its lower end by a pivot 31 to the short arm of a hook lever 32. The end of the hook lever 32 is pivoted at 33 to one arm of a bell crank 34, the other arm of said bell crank being pivoted at 35 to a link 36 the lower end of which is pivotally connected to an arm 37 of a second bell crank the other arm being the part 18 forming one member of the secondary toggle joint. A third arm 27 is extended to form a lever by which the device is reset after having been tripped.

The extreme right hand end of the hook lever 32 is provided with a hook 38 adapted to engage with the teeth 39 of a ratchet wheel 40 on the main shaft D of the machine. The rear surface of the hook 38 is provided at 41 with a cam surface adapted to engage the ends of the teeth 39 of the tooth wheel 40 and to ride up on the points of the teeth up the hook 38 and releasing it from engagement with the said tooth wheel when a predetermined point has been reached. The point of contact between the rod 30 and the hook lever 32 is adjustable by means of a thumb screw 42 to vary the distance through which the feelers 21 and 22 must move to cause the hook to engage the toothed wheel 40.

The lever 36 is connected with the arm 37 forming part of the secondary toggle by a cushion comprising a spring 43 interposed between a sliding collar 44 on which is pivoted the arm 37 and a nut 45. This cushion serves to prevent in part the shock which would otherwise occur when the secondary toggle is broken and the pivot 20 begins to descend suddenly under the weight of the box form B, horn C and attached parts.

At 47 is shown a dash pot formed in the frame of the machine and at 48 is seen a piston therein, said piston being connected by a link 49 to the fixed pivot 14 of the main toggle joint. This dash pot also takes up the shock due to the sudden drop of the parts when the secondary toggle joint is broken. As the box form, main toggle joint and the parts which operate them are of necessity heavy it is desirable to prevent any undue shock which would otherwise occur when the toggle joint is suddenly broken.

The hook lever 32 is proportioned in weight so that it balances the lever 28 and connecting rod 30 and any pressure exerted on the lever 28 by the feelers 21 and 22 and the arm 24. By so proportioning the parts, the sensitiveness of the device is greatly increased since there is no weight to be lifted, it being necessary only to overcome the inertia of the parts.

The operation of my machine is as follows: In case the operator's fingers are over the edge of the box form or so near the edge as to come in contact with either of the feelers 21 or 22 the feelers will be lifted up as the box form rises. The movement of the feelers though very slight oscillates the rod 23 and raises the arm 28. This pulls the hook lever 32 down into contact with the revolving toothed wheel 40. As soon as the hook 38 catches the toothed wheel 40 the bell crank 34 is pulled over lifting up the arm 37 of the secondary toggle joint. As the secondary toggle joint begins to bend, the weight of the supporting lever 15 and attached parts lowers it farther and carries down with it the fixed pivot 14 preventing the main toggle joint from raising the box form into contact with the platen.

This action is practically instantaneous and is positive since the hook lever 32 is pulled to the right a pre-determined distance, and the fixed pivot 14 is lowered as described. The device is very sensitive since the parts are balanced as described and the hooked lever requires to be moved only a very small distance to cause it to engage the disk 40.

What I claim is:

1. In a machine of the character described and in combination with a press, one member of which is movable toward and away from the other, of an actuating element, a support on which said element is pivotally mounted, means for moving said actuating element about its pivot on said support, and thereby operating said movable presser member, a feeler at the point where the pressing takes place, and means operated by the feeler to move the said support and thereby interrupt the operation of said movable presser member.

2. In a machine of the character described and in combination with a press operated by a toggle joint, a feeler at the point where the pressing takes place, a support for the fixed pivot of the toggle joint, and means operated by the feeler to lower the said support and interrupt the action of the toggle joint.

3. In a machine of the character described and in combination with a press one member of which is moved toward the other by an actuating element, a feeler at the point where the pressing takes place, a support for the said actuating element, a constantly moving toothed member, a hook to engage said toothed member, means operated by the hook to lower said support and interrupt the action of the actuating member, and connections between the feeler and the hook to cause the hook to engage the toothed member when the feeler is moved.

4. In a machine of the character described and in combination with a press operated by a toggle joint, a feeler at the point where the pressing takes place, a support for the fixed pivot of the toggle joint, a constantly moving toothed member, a hook to engage said toothed member, means operated by the hook to lower the said support and interrupt the action of the toggle joint, and connections between the feeler and the hook to cause the hook to engage the toothed member when the feeler is moved.

5. In a machine of the character described and in combination with a box form and platen, a hopper having movable sides, a feeler adjacent the pressing surface of the box form and platen, said feeler being mounted on a rod and slidable longitudinally thereof by the movement of the hopper sides, an actuating element for the box form, a support for said actuating element and means operated by the movement of the rod on which said feeler is mounted to lower the said support and interrupt the action of the box form.

6. In a machine of the character described and in combination with a press operated by a toggle joint, a feeler adjacent the point where the pressing takes place, a support for the fixed pivot of the toggle joint, a constantly moving toothed member, a hook to engage said toothed member, means operated by the hook to lower the said support and interrupt the action of the toggle joint, connections between the feeler and the hook to cause the hook to engage the toothed member when the feeler is moved, said feeler and said hook acting against each other and together with said connections counterbalancing each other.

7. In a machine of the character described and in combination with a press operated by a toggle joint, said toggle joint having a normally fixed pivot, a secondary toggle joint forming a support for the normally fixed pivot of the main toggle joint, a feeler adjacent the point where the pressing takes place, and connections between the feeler and the secondary toggle joint to break the secondary toggle when the feeler is moved.

8. In a machine of the character described and in combination with a press operated by a main toggle joint, said toggle joint having a normally fixed pivot, a secondary toggle joint forming a support for said normally fixed pivot one member of said secondary toggle being a bell-crank lever, a constantly moving toothed member, a hook pivoted on said bell-crank lever, a feeler adjacent the point where the pressing takes place, and connections between the feeler and the hook whereby a movement of the feeler causes the hook to engage the constantly moving member and move the bell-crank lever to break the secondary toggle joint.

In testimony whereof I affix my signature, in presence of two witnesses.

EUGENE H. TAYLOR.

Witnesses:
GEORGE P. DIKE,
ALICE H. MORRISON.

Copies of this patent may be obtained for five cents each, by addressing the "Commissioner of Patents, Washington, D. C."